United States Patent
Garg et al.

(10) Patent No.: US 9,927,858 B2
(45) Date of Patent: *Mar. 27, 2018

(54) REMOTE DEVICE WAKING USING A MULTICAST PACKET

(71) Applicant: MICROSOFT TECHNOLOGY LICENSING, LLC, Redmond, WA (US)

(72) Inventors: Sumit Garg, Seattle, WA (US); Murari Sridharan, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/057,119

(22) Filed: Feb. 29, 2016

(65) Prior Publication Data

US 2016/0182243 A1 Jun. 23, 2016

Related U.S. Application Data

(63) Continuation of application No. 11/653,681, filed on Jan. 16, 2007, now Pat. No. 9,319,225.

(51) Int. Cl.
*G06F 1/32* (2006.01)
*H04L 29/08* (2006.01)
(Continued)

(52) U.S. Cl.
CPC ............ *G06F 1/3203* (2013.01); *H04L 12/12* (2013.01); *H04L 12/185* (2013.01); *H04L 12/1895* (2013.01); *H04L 45/16* (2013.01); *H04L 45/66* (2013.01); *H04L 61/1511* (2013.01); *H04L 67/145* (2013.01); *H04L 29/08612* (2013.01); *H04W 40/005* (2013.01); *H04W 52/0219* (2013.01); *H04W 52/0225* (2013.01);
(Continued)

(58) Field of Classification Search
None
See application file for complete search history.

(56) References Cited

U.S. PATENT DOCUMENTS 5,742,833 A 4/1998 Dea
5,826,015 A * 10/1998 Schmidt .............. G06F 21/572
709/229

(Continued)

FOREIGN PATENT DOCUMENTS

KR 20050005026 A 1/2005

OTHER PUBLICATIONS

Lieberman Software Corporation, White Paper: Wake on LAN Technology, 9 pages, Revision 2, Jun. 1, 2006. http://www.lanicu.com/whitepapers/pdf_files/Wake_On_LAN.pdf.
(Continued)

*Primary Examiner* — Andrew Oh
(74) *Attorney, Agent, or Firm* — L. Alan Collins; Collins & Collins Intellectual, LLC

(57) ABSTRACT

Sleeping device(s) may be changed from a sleeping state to an awake state using a multicast packet that sent to a multicast address of a multicast wake-up group. The packet may include an identifier for one or more particular device(s) in the multicast group, which, when received by the device(s), causes the device(s) to wake up.

15 Claims, 4 Drawing Sheets

(51) Int. Cl.

| | | |
|---|---|---|
| *H04L 12/12* | (2006.01) | |
| *H04L 12/18* | (2006.01) | |
| *H04L 12/761* | (2013.01) | |
| *H04L 12/721* | (2013.01) | |
| *H04L 29/12* | (2006.01) | |
| *H04W 40/00* | (2009.01) | |
| *H04W 68/00* | (2009.01) | |
| *H04W 52/02* | (2009.01) | |

(52) U.S. Cl.
CPC .............. *H04W 68/00* (2013.01); *Y02B 60/33* (2013.01); *Y02B 60/34* (2013.01); *Y02B 60/35* (2013.01); *Y02B 60/50* (2013.01)

(56) References Cited

U.S. PATENT DOCUMENTS

| | | | | |
|---|---|---|---|---|
| 5,884,323 | A * | 3/1999 | Hawkins | G06F 17/30286 |
| 5,973,613 | A * | 10/1999 | Reis | G01S 13/74 |
| | | | | 340/10.2 |
| 6,003,084 | A | 12/1999 | Green et al. | |
| 6,047,378 | A * | 4/2000 | Garrett | G06F 1/3209 |
| | | | | 713/300 |
| 6,049,885 | A * | 4/2000 | Gibson | G06F 1/3209 |
| | | | | 709/223 |
| 6,052,779 | A | 4/2000 | Jackson et al. | |
| 6,101,608 | A * | 8/2000 | Schmidt | H04L 12/12 |
| | | | | 713/162 |
| 6,272,190 | B1 * | 8/2001 | Campana, Jr. | H04B 7/10 |
| | | | | 375/347 |
| 6,292,508 | B1 * | 9/2001 | Hong | H04B 1/7156 |
| | | | | 375/134 |
| 6,339,792 | B1 * | 1/2002 | Allison | G06F 1/3209 |
| | | | | 709/227 |
| 6,526,507 | B1 * | 2/2003 | Cromer | H04L 63/04 |
| | | | | 370/260 |
| 6,591,368 | B1 | 7/2003 | Ryu | |
| 6,606,709 | B1 | 8/2003 | Connery et al. | |
| 6,697,383 | B1 * | 2/2004 | Li | H04L 7/042 |
| | | | | 370/472 |
| 6,745,240 | B1 * | 6/2004 | Denman | G06F 9/5066 |
| | | | | 709/220 |
| 6,795,450 | B1 * | 9/2004 | Mills | H04L 12/12 |
| | | | | 370/419 |
| 6,915,346 | B1 | 7/2005 | Kato et al. | |
| 6,938,040 | B2 * | 8/2005 | Allison | G06F 1/3209 |
| 6,993,670 | B2 | 1/2006 | Weng et al. | |
| 7,047,428 | B2 | 5/2006 | Bui | |
| 7,324,518 | B2 * | 1/2008 | Dai | H04L 12/12 |
| | | | | 370/392 |
| 7,779,451 | B2 * | 8/2010 | Eldar | H04L 12/12 |
| | | | | 726/2 |
| 9,319,225 | B2 | 4/2016 | Garg | |
| 2002/0077995 | A1 * | 6/2002 | Allison | G06F 1/3209 |
| 2002/0194498 | A1 | 12/2002 | Blight | |
| 2003/0026240 | A1 * | 2/2003 | Eyuboglu | H04B 7/2625 |
| | | | | 370/349 |
| 2003/0109972 | A1 * | 6/2003 | Tak | G06Q 10/02 |
| | | | | 701/31.4 |
| 2003/0206564 | A1 * | 11/2003 | Mills | H04L 12/12 |
| | | | | 370/528 |
| 2003/0235168 | A1 | 12/2003 | Sharma et al. | |
| 2004/0101046 | A1 * | 5/2004 | Yang | H03M 13/15 |
| | | | | 375/240.08 |
| 2004/0158872 | A1 * | 8/2004 | Kobayashi | H04L 12/1886 |
| | | | | 725/120 |
| 2004/0246961 | A1 * | 12/2004 | Dai | H04L 12/12 |
| | | | | 370/392 |
| 2004/0259574 | A1 | 12/2004 | Daniels | |
| 2005/0005026 | A1 | 1/2005 | Brown et al. | |
| 2005/0086460 | A1 | 4/2005 | Huang | |
| 2005/0091331 | A1 * | 4/2005 | Brown | H04L 12/12 |
| | | | | 709/208 |
| 2005/0108407 | A1 | 5/2005 | Johnson et al. | |
| 2005/0135334 | A1 | 6/2005 | Rajkotia | |
| 2005/0143056 | A1 * | 6/2005 | Iyer | H04W 4/10 |
| | | | | 455/416 |
| 2005/0144493 | A1 * | 6/2005 | Cromer | G06F 9/4416 |
| | | | | 713/310 |
| 2005/0166213 | A1 * | 7/2005 | Cromer | H04L 12/12 |
| | | | | 719/315 |
| 2005/0181815 | A1 * | 8/2005 | Shostak | H04L 12/1822 |
| | | | | 455/519 |
| 2005/0220063 | A1 | 10/2005 | Hong | |
| 2005/0223248 | A1 * | 10/2005 | Lim | G06F 1/28 |
| | | | | 713/300 |
| 2005/0233735 | A1 | 10/2005 | Karaoguz | |
| 2005/0254444 | A1 | 11/2005 | Meier et al. | |
| 2005/0276237 | A1 * | 12/2005 | Segal | H04L 12/12 |
| | | | | 370/312 |
| 2006/0034318 | A1 * | 2/2006 | Fernandes | H04L 12/2854 |
| | | | | 370/463 |
| 2006/0036678 | A1 * | 2/2006 | Rhim | H04L 67/16 |
| | | | | 709/203 |
| 2006/0039373 | A1 * | 2/2006 | Nakamura | H04L 12/12 |
| | | | | 370/389 |
| 2006/0188864 | A1 | 8/2006 | Shah | |
| 2006/0209751 | A1 * | 9/2006 | Hsu | H04W 8/00 |
| | | | | 370/328 |
| 2007/0050645 | A1 * | 3/2007 | Siegmund | H04L 12/12 |
| | | | | 713/300 |
| 2007/0067445 | A1 * | 3/2007 | Vugenfirer | H04L 67/141 |
| | | | | 709/224 |
| 2007/0115827 | A1 * | 5/2007 | Boehnke | G08C 17/02 |
| | | | | 370/236 |
| 2007/0130289 | A1 * | 6/2007 | Defazio | G06F 21/6218 |
| | | | | 709/218 |
| 2007/0211725 | A1 | 9/2007 | Kawata et al. | |
| 2007/0230441 | A1 * | 10/2007 | Sethi | H04L 12/18 |
| | | | | 370/352 |
| 2007/0234401 | A1 | 10/2007 | Eldar | |
| 2008/0089338 | A1 * | 4/2008 | Campbell | H04L 41/00 |
| | | | | 370/392 |
| 2008/0101445 | A1 * | 5/2008 | Ho | H04L 29/12216 |
| | | | | 375/222 |
| 2008/0137591 | A1 * | 6/2008 | Hirano | H04L 63/18 |
| | | | | 370/328 |
| 2008/0160017 | A1 | 7/2008 | Baker | |
| 2010/0158000 | A1 * | 6/2010 | Muramoto | H04L 12/1827 |
| | | | | 370/390 |
| 2015/0095680 | A1 * | 4/2015 | Gossain | G06F 1/26 |
| | | | | 713/323 |

OTHER PUBLICATIONS

L. F. Polio and I. Jansch-Porto, A Network-Oriented Power Management Architecture, pp. 693-706, In Proceedings of the IFIP/IEEE Eighth International Symposium on Integrated Network Management, Mar. 24-28, 2003.
OvisLink, Corp., "Wake-On-LAN PCI Fast Ethernet Adapter", 2 pages, as archived on web.archive.org on Sep. 10, 2006.
Windows Hardware Developer Central, Network Device Class: Version 2.0 Oct. 12, 2000, 7 pages, http://www.microsoft.com/whdc/resources/respec/specs/pmref/PMnetwork.mspx Uploaded Dec. 4, 2001.
U.S. Appl. No. 11/653,681, filed Jan. 16, 2007, Garg.
U.S. Appl. No. 15/062,108, filed Mar. 5, 2016, Garg.
"Final Office Action Issued in U.S. Appl. No. 15/062,108", dated Oct. 26, 2017, 19 Pages.
"Non Final Office Action Issued in U.S. Appl. No. 15/062,108", dated Jan. 10, 2018, 21 Pages.

\* cited by examiner

US 9,927,858 B2

REMOTE DEVICE WAKING USING A MULTICAST PACKET

RELATED APPLICATION(S)

This Application is a Continuation of, and claims benefit from, U.S. patent application Ser. No. 11/653,681 that was filed on Jan. 16, 2007, and that is incorporated herein by reference in its entirety.

BACKGROUND

1. Technical Field

Embodiments of the invention relate to waking a sleeping computerized device, and in particular to waking a sleeping device remotely using a multicast packet.

2. Discussion of Related Art

Some computers are configured to save power by transitioning to a low power state during a period of inactivity. For example, if a user leaves a computer idle for a period of time, the computer may transition into a low-power state. The computer may transition back into a normal-power state in response to receiving user input, such as a button press or mouse movement. When the computer is in the low power state, it is said to be "asleep," and when the computer is in a state powered for normal operation, the computer is said to be "awake."

A problem can arise when a user wishes to remotely access a computer that is asleep. For example, a person who is at home may wish to remotely access an office computer to obtain a file stored on the office computer. If the office computer is asleep, the office computer may not be able to communicate with other computers. Since the user is remote from the office computer, the user is unable to press a button or move the mouse on the office computer to wake it up.

One prior technique for waking up a computer remotely is to program the computer's network adapter to wake up the computer upon reception of an address resolution protocol (ARP) request directed to the computer.

SUMMARY

The Applicants have appreciated that the above-described prior technique for remotely waking up a sleeping computer over a network may lead to frequently waking up the computer unintentionally, as common network traffic, not intended to wake up a computer, may unintentionally cause the computer to wake up. Unintentionally waking up a computer can lessen the power savings achievable by setting the computer to a low power state during a period of inactivity.

One embodiment relates to waking a sleeping device using a multicast packet. A device for which it is desired to enable remote waking may be joined to a multicast group. To wake up the device, a packet may be sent to the multicast address of the multicast group, and the packet may be distributed to each of the devices in the multicast group. The packet may include an identifier for one or more particular device(s) in the multicast group, which, when received by the device(s), causes the device(s) to wake up. The other devices in the multicast group may not wake up because they may determine, based on the identifier(s) included in the packet, that the packet was not intended for them.

Another embodiment relates to least one computer readable medium having computer executable instructions stored thereon. When executed, they perform a method that may be used by a first device to change the first device from a sleeping state of the first device to an awake state of the first device. The first device may be a member of a multicast group, and may receive a multicast packet sent to at least two devices that are members of the multicast group. The first device may determine whether the multicast packet includes an identifier of the first device. If so, the first device may change from the sleeping state of the first device to the awake state of the first device.

Yet another embodiment relates to a method, for use by a second device, for changing a first device from a sleeping state of the first device to an awake state of the first device. The first device may be a member of a multicast group that includes at least two devices. The second device may receive a first packet sent to an address of the multicast group. The first packet may include an identifier of the first device. In response to receiving the first packet, a multicast packet may be sent to the at least two devices that are members of the multicast group. The multicast packet may include the identifier of the first device to indicate that the first device should be changed from the sleeping state of the first device to the awake state of the first device.

A further embodiment relates to a device that includes a processor configured to change from a sleeping state of the processor to an awake state of the processor in response to receiving a wake-up signal from a network communication module that is in communication with the processor. The device also includes a network communication module that receives a multicast packet sent to devices that are members of a multicast group. The network communication module determines whether the multicast packet includes an identifier of the first device, and if so, provides a wake-up signal to the processor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF DRAWINGS

In the drawings, each identical or nearly identical component that is illustrated in various figures is represented by a like numeral. For purposes of clarity, not every component may be labeled in every drawing. In the drawings.

DETAILED DESCRIPTION

The Applicants have appreciated that the above-described prior technique for remotely waking a sleeping device may lead to a significant number of unintended device wakings caused by receiving common network traffic. These "false positives" may cause devices on a network to wake up unintentionally. The Applicants have appreciated that unintended device wakings may happen with great frequency on some networks. Unintended device wakings may lead to excess power usage and/or battery drain, and decrease the potential power savings that is achievable by having a computer go to sleep during idle periods. Some embodiments relate to techniques for remotely waking a sleeping device that may reduce the number of unintended device wakings.

One embodiment relates to remote waking of a sleeping device using a multicasting technique. A device may be joined to a multicast group that may be dedicated to waking up sleeping devices over a network. To wake up a sleeping device, the sleeping device and any other devices belonging to the same multicast group may be sent a multicast "wake-up packet" that includes information identifying the device to be woken up. In response to receiving the wake-up packet, the sleeping device may examine the identifying information in the wake-up packet and determine that the wake-up packet is intended for that device, and the sleeping device may wake up. The other devices in the multicast group that receive the multicast wake-up packet may not wake up (if they are asleep), but may discard the packet in response to determining that the wake-up packet is not intended for them.

Another embodiment, the wake-up packet may identify any number of devices to be woken up, and not just a single device. For example, a multicast wake-up packet may include identifiers for a plurality of devices, which, when received by the plurality of devices, cause them to wake up.

In yet another embodiment, every device in a multicast group may be woken up by a multicast wake-up packet. For example, multiple multicast wake-up groups may be formed (e.g., within an organization) so that the granularity of control over the number of devices woken up may be based on the number of devices in a multicast group.

Figure 1:
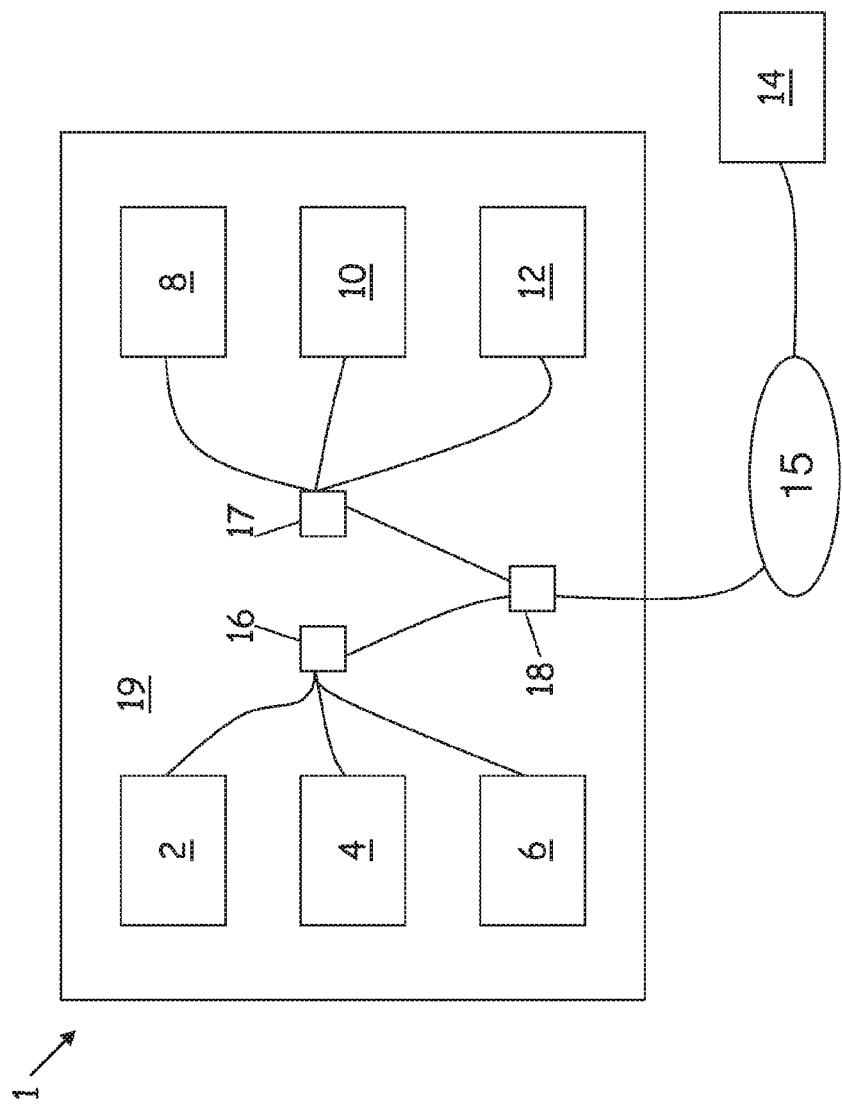
FIG. 1 is a block diagram illustrating a computing environment in which embodiments may be implemented.

FIG. 1 is a block diagram illustrating an example of a computing environment 1 in which embodiments may be implemented. Computing environment 1 includes devices 2, 4, 6, 8, 10, 12 and 14, routers 16-18 and network 15. Devices 2, 4, 6, 8, 10 and 12 and routers 16-18 may be associated with an organization 19, for example.

In one embodiment, a user may be using device 14 (e.g., the user's home computer or any other computer), and may wish to remotely access device 2 (e.g., the user's office computer or any other computer) for any purpose (e.g., to obtain a file stored on device 2). The user may attempt to gain access to device 2 remotely via network 15 (e.g., the Internet or any other suitable network) and routers 16 and 18. However, the user may not be able to achieve the desired access (e.g., to obtain the desired file) while device 2 is asleep. In accordance with one embodiment, to wake up device 2, the user's device 14 may initiate the sending of a packet to the multicast group (e.g., at a multicast address) of which device 2 is a member. The sending can be initiated in any suitable way (e.g., the device 14 may send the packet itself, or may communicate with another device in the system which may send the packet).

Multicasting refers to a family of techniques in which a packet that is sent to a multicast address is forwarded to multiple final destination devices. For example, if devices 2, 4 and 6 are members of a multicasting group, each of devices 2, 4 and 6 may be sent a copy of packets that are sent to the address for the multicasting group. Any suitable multicasting protocol may be used (such as the Internet Group Management Protocol Multicast Listener Discovery Protocol (IGMP/MLD), for example) as the techniques described herein are not limited in this respect. In one embodiment, device 2 may be joined to a "remote wake-up" multicast group, which may be a multicast group dedicated to enabling remote waking of the devices that are members of the group. Any suitable network device may send the multicast packet to members of the multicast group, such as a router (e.g., router 16). In this embodiment, the remote wake-up multicast group includes devices 2, 4 and 6 which are members of the same subnet, however, this is merely an example and any other suitable combination of devices may join a multicast group. A device may join the multicast group in any suitable way. For example, device 2 itself may be used to join the appropriate group directly, or a system administrator may configure the multicast group to include device 2 by using any other computer.

When the user wishes to wake up device 2 (e.g., from a remote device), device 14 or any other device may initiate the sending of one or more packets to the address for the remote wake-up multicast group to which device 2 belongs. When router 16 receives the packet(s) it may multicast (e.g., send) the packet(s) to each of the devices that are members of the remote wake-up multicast group (e.g., devices 2, 4 and 6). To wake up device 2, the packet(s) initiated by device 14 and forwarded by router 16 may include an identifier for device 2. When device 2 receives the multicast packet, it may examine the contents of the multicast packet and determine that the packet was intended for device 2, upon recognition of the identifier for device 2. Any suitable identifier can be used, examples of which are discussed below. In response to determining that the packet is intended for device 2, device 2 may transition from a sleeping state to a waking state in any suitable manner (examples of which are described below). Other devices (e.g., devices 4 and 6) may also receive the multicast packet, examine its contents, and determine that the packet is not intended for them, for example, because the packet does not contain an identifier for either of devices 4 or 6, and they may discard the packet, and will not transition to a waking state (if they are asleep).

Figure 2:
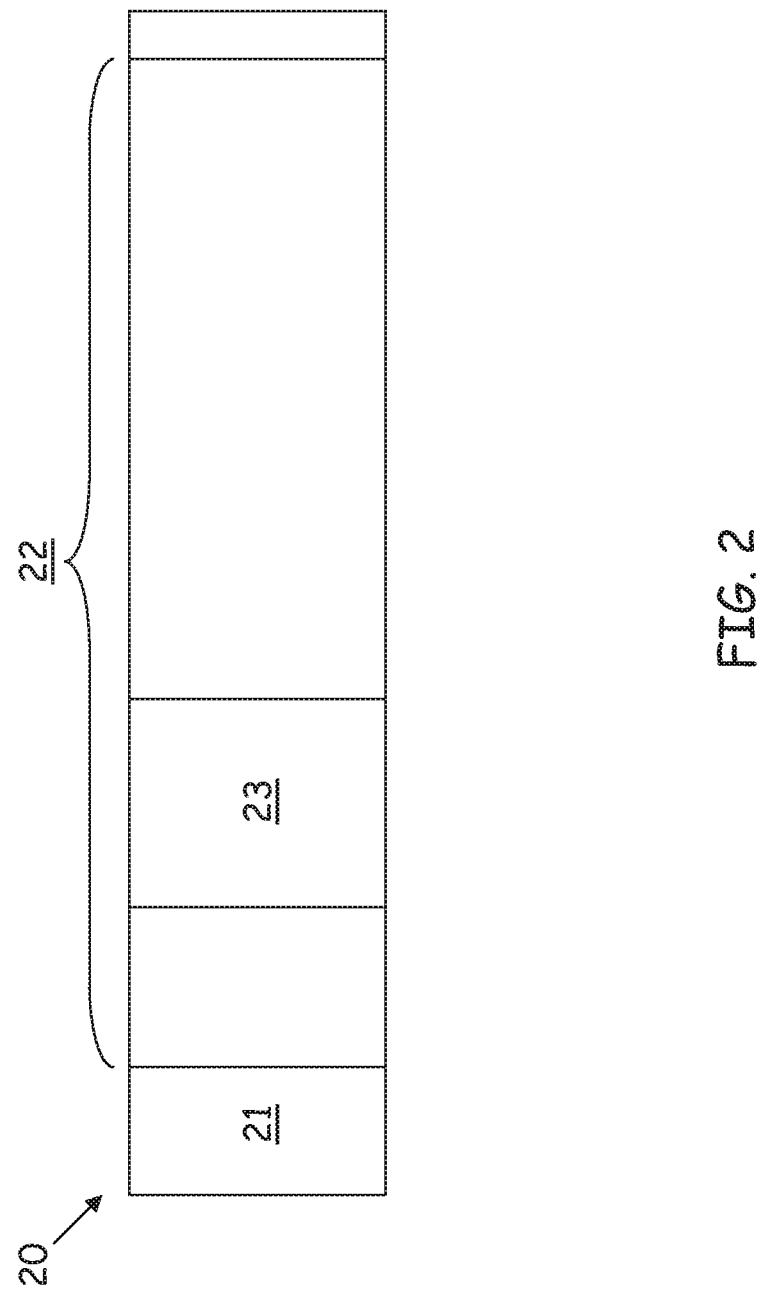
FIG. 2 is a diagram illustrating an example of a multicast packet that may be used to wake up a sleeping device, according to one embodiment.

FIG. 2 is a diagram illustrating an example of a wake-up packet 20 that may be sent to wake up a device (e.g., by device 14) in accordance with some embodiments. Wake-up packet 20 includes a header portion 21 and a payload portion 22. Header portion 21 may include the multicast address for the multicast group of which device 2 is a member. Payload portion 22 may include the identifier 23 for the device that is to be woken up (e.g., device 2). However, this configuration is illustrated merely by way of example, as the techniques described herein are not limited as to the particular packet configuration that is used. Any suitable type identifier 23 may be used for device 2, such as an Internet protocol (IP) address, a medium access control (MAC) address, and/or another type of identifier. In one aspect, multiple copies of identifier 23 may be included in packet 20. If the IP address of device 2 is to be included in the packet(s), device 14 or another device constructing the packet may obtain the IP address of device 2 by performing a domain name server (DNS) lookup, or by using any other suitable technique. In some implementations, wake-up packet 20 may include authentication information (e.g., a user name and/or password) for security purposes, and a sleeping device may verify the authentication information prior to waking up, as discussed further below. If authentication information is used, it may be configured and presented to the sleeping device (e.g., device 2) or another device in any suitable way.

Figure 3:
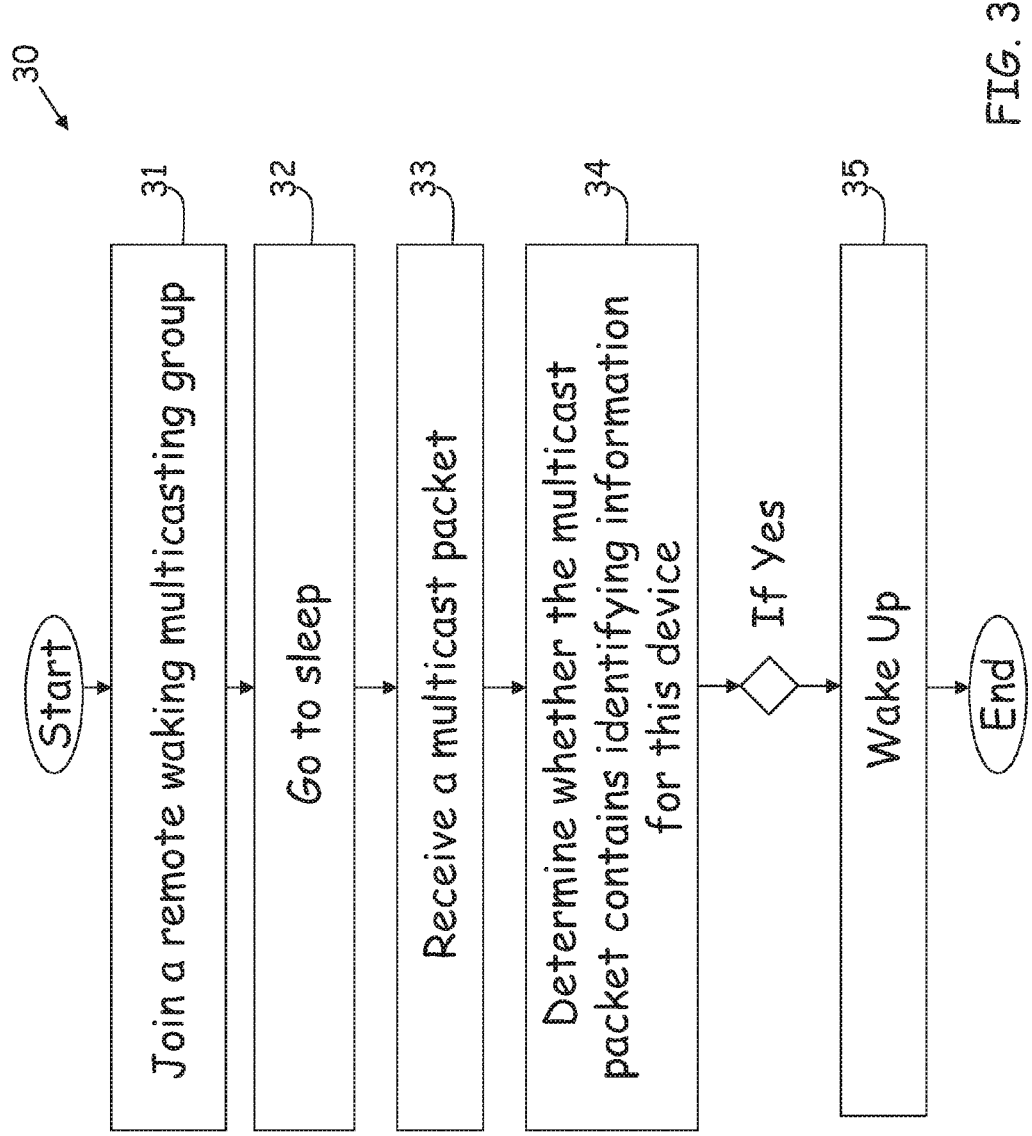
FIG. 3 is a flow chart illustrating a method of remotely waking a device, according to one embodiment.

FIG. 3 is a flow chart illustrating a method 30 for a device to transition from a sleeping state to an awake state, according to one embodiment.

In act 31, a device (e.g., device 2) may be joined to a multicasting group to enable the device to be woken up remotely via a network connection. Any number of devices may be included as members of the multicasting group. As one example, the devices on the same subnet (e.g., devices 2, 4 and 6) that have remote waking enabled may be joined to the same multicasting group. In one aspect, the multicasting group may be dedicated to waking devices via a network connection. However the techniques described herein are not so limited, as packets sent to the address of the multicasting group may also be used for other purposes. Once a device has been joined to the multicasting group, the device may be woken up remotely by sending the device an appropriate wake-up packet.

In act 32, the device e.g., device 2) may go to sleep. As used herein, the terms "asleep," "awake," "sleeping," and the like refer to the power state of the device. On average, a device and/or processor that is asleep may consume less power than a device and/or processor that is awake. A device that is asleep may have reduced functionality due to one or more components of the device having their power reduced or turned off completely. The techniques described herein are not limited as to the particular components of the device that have their power reduced or turned off while the device is asleep, as any suitable components may be powered down. In some embodiments, a network communication module 412 associated with a device may remain awake so that it is capable of receiving a wake-up packet. Network communication module 41 is discussed in further detail below with reference to FIG. 4.

In act 33, the device (e.g., device 2) may receive a multicast wake-up packet. In response to receiving the wake-up packet, the device may examine the contents (e.g., the payload) of the packet network. For example, network communication module 412 may examine the contents of the packet, in act 34, the network communication module 412 any other suitable component) may determine whether or not the packet includes one or more identifiers for the device (e.g., device 2). If the packet includes an identifier (e.g., an IP address, MAC address and/or other identifier) for the device, the network communication module 412 may send a signal to a processor associated with the device to wake up the processor. In one embodiment, the processor may be a central processing unit (CPU) for the device, although the signal may be sent, additionally or alternatively, to any other processor, in one embodiment, the device may also check authentication information included in the packet prior to waking up the devices, although authentication need not be used in embodiments.

In act 35, the device (e.g., device) may change from a state of being asleep to a state of being awake. For example, the device may include a processor that receives the wake-up signal from the network communication module 412. In response to receiving the wake-up signal, the processor may transition from a sleeping state to an awake state. The device may turn on and/or increase power to one or more components (e.g., the monitor, hard drive, etc, of the device that were previously asleep.

In one embodiment, the user's device (e.g., device 14) may attempt to communicate with the sleeping device (e.g., device 2) via network 15, if the user's device (e.g., device 14) does not receive a response from the sleeping device (e.g., device 2), the user's device may initiate sending one or more wake-up packets 20 to the multicast address to wake up the sleeping device. The user's device (e.g., device 14) may use any suitable criteria to determine when to initiate sending a wake-up packet 20. For example, the user's device may try to communicate with the sleeping device a predetermined number of times, after which the wake-up packet 20 may be sent. As another example, the user's device may wait a predetermined period of time after attempting to communicate with the sleeping device, after which the wake-up packet 20 may be sent. Any suitable software (e.g., an operating system) and/or hardware associated with device 14 may make the determination that communication with device 2 has failed and initiate the sending of wake-up packet 20. In some embodiments, the user's device (e.g., device 14) may initiate sending a wake-up packet 20 in response to receiving a user's command to do so. However, any other device or component (e.g., a network component) may detect a communication failure with the sleeping device (e.g., device 2), and any other device may send a wake-up packet, as the techniques described herein are not limited as to the device that initiates the sending of the packet or determines when communication has failed With some multicast protocols, a router (e.g., router 16) may periodically send a query to devices in the multicast group (e.g., devices 2, 4 and 6) to determine whether at least one device is still in the group. In some embodiments, at least one device in the multicasting group may stay awake to respond to these queries so that the router continues to send multicast traffic to the group. For example, one device could be dedicated to remain awake all the time to respond. As another example, a device that is about to go to sleep may first query other devices in the multicasting group to make sure that another device is still awake to respond to the router's queries and only go to sleep if another device is awake, if not other device is awake, the device may stay awake and check back periodically until it detects that another device is awake, at which point it may go to sleep. However, any suitable technique may be used to ensure that the router (e.g., router 16) that forwards the multicast traffic continues to do so.

Figure 4:
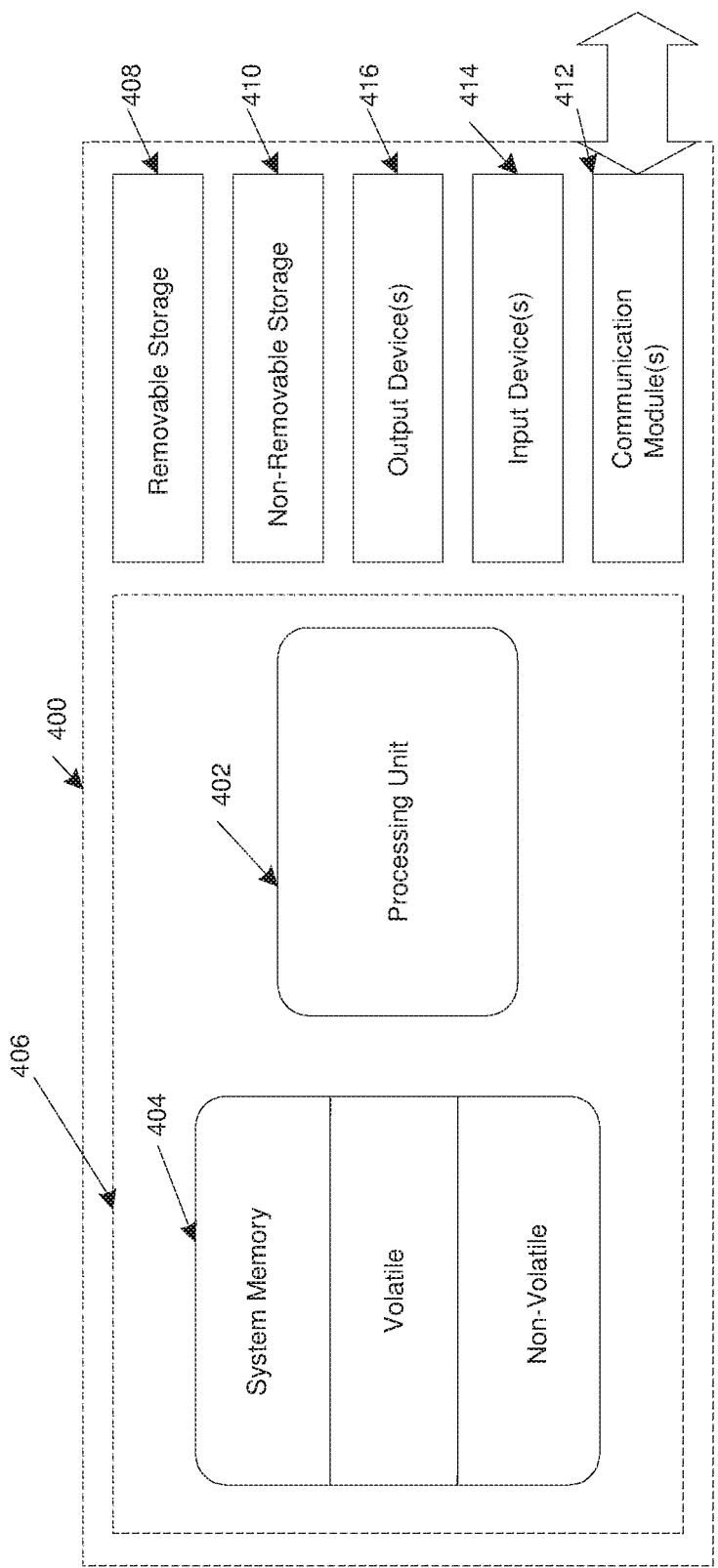
FIG. 4 illustrates an exemplary computer system on which embodiments may be implemented.

With reference to FIG. 4, an exemplary system for implementing some embodiments is illustrated. FIG. 4 illustrates computing device 400, which may be a device suitable to function as any of devices 2, 4, 6, 8, 10, 12 and/or 14. Computing device 400 may include at least one processor 402 and memory 404. Depending on the configuration and type of computing device, memory 404 may be volatile (such as RAM), non-volatile such as ROM, flash memory, etc) or some combination of the two. This configuration is illustrated in FIG. 4 by dashed line 40.

Device 400 may include at least some form of computer readable media. By way of example, and not limitation, computer readable media may comprise computer storage media. For example, device 400 rimy also include storage removable and/or non-removable) including, but not limited to, magnetic or optical disks or tape. Such additional storage is illustrated in FIG. 4 by removable storage 408 and non-removable storage 410. Computer storage media may include volatile and nonvolatile media, removable, and non-removable media of any type for storing information such as computer readable instructions, data structures, program modules or other data 404, removable storage 408 and non-removable storage 410 all are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 400. Any such computer storage media may be part of device 400. Device 400 may also contain network communications module(s) 412 that allow the device to communicate with other devices via one or more communication media. By way of example, and not limitation, communication media may include wired media such as a wired network or direct-wired connection, and wireless media such as acoustic, RF, infrared and other wireless media. Network communication module(s) 412 may be a component that is capable of providing an interface between device 400 and the one or more communication media, and may be one or more of a wired network card, a wireless network card, a modem, an infrared transceiver, an acoustic transceiver and/or any other suitable type of network communication module.

Device 400 may also have input device(s) 414 such as a keyboard, mouse, pen, voice input device, touch input device, etc. Output device(s) 416 such as a display, speakers, printer, etc. may also be included. All these devices are well known in the art and need not be discussed at length here.

It should be appreciated that the techniques described herein are not limited to executing on any particular system or group of systems. For example, embodiments may run on one device or on a combination of devices. Also, it should be appreciated that the techniques described herein are not limited to any particular architecture, network, or communication protocol.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

This techniques described herein are not limited in their application to the details of construction and the arrangement of components set forth in the following description or illustrated in the drawings. The techniques described herein are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method performed on a computing device that includes at least one processor, memory, and a network communication module, the method comprising:
   receiving, by the network communication module while the computing device is asleep, a multicast packet that is addressed to a multicast group that is dedicated to waking up devices, where a payload portion of the received multicast packet comprises a network address of each of a plurality of devices to be woken, and where at least one of the plurality of network addresses of the devices to be woken in the payload portion of the received multicast packet is an internet protocol ("IP") address; and
   waking, by the network communication module in response to one of the plurality of network addresses matching a network address of the computing device and in response to the computing device being joined to the multicast group, the asleep computing device.

2. The method of claim 1 where the received multicast packet comprises authentication information that corresponds to at least one of the devices to be woken.

3. The method of claim 2 where the waking is conditioned at least in part on verifying the authentication information.

4. The method of claim 1 further comprising responding, by the computing device, to a query message sent to the multicast group by a router.

5. The method of claim 1 where at least one of the plurality of network addresses of the devices to be woken in the received multicast packet is a media access control ("MAC") address.

6. A computing device comprising:
   at least one processor;
   memory coupled to the at least one computing device;
   a network address;
   a network communication module configured to receive, while the computing device is asleep, a multicast packet that is directed to a multicast group that is dedicated to waking up devices, where a payload portion of the received multicast packet comprises a network address of each of a plurality of devices to be woken, and where at least one of the plurality of network addresses of the devices to be woken in the payload portion of the received multicast packet is an internet protocol ("IP") address; and
   the network communication module of the asleep computing device further configured wake, in response to one of the plurality of network addresses matching a network address of the computing device and in response to the computing device being joined to the multicast group, the asleep computing device.

7. The computing device of claim 6 where the received multicast packet comprises authentication information that corresponds to at least one of the devices to be woken.

8. The computing device of claim 7 where the waking is conditioned at least in part on verifying the authentication information.

9. The computing device of claim 6, the network communication module further configured to respond to a query message sent to the multicast group by a router.

10. The computing device of claim 6 where at least one of the plurality of network addresses of the devices to be woken in the received multicast packet is an media access control ("MAC") address.

11. At least one computer readable storage apparatus storing computer executable instructions that, based on execution by a computing device that includes at least one processor, memory, a network address, and a network communication module, configure the computing device to perform actions comprising:
   receiving, by the network communication module while the computing device is asleep, a multicast packet that is directed to a multicast group that is dedicated to waking up devices, where a payload portion of the received multicast packet comprises a network address of each of a plurality of devices to be woken, and where at least one of the plurality of network addresses of the devices to be woken in the payload portion of the received multicast packet is an internet protocol ("IP") address; and
   waking, by the network communication module in response to one of the plurality of network addresses matching a network address of the computing device and in response to the computing device being joined to the multicast group, the asleep computing device.

12. The at least one computer readable storage apparatus of claim 11 where the received multicast packet comprises authentication information that corresponds to at least one of the devices to be woken.

13. The at least one computer readable storage apparatus of claim 12 where the waking is conditioned at least in part on verifying the authentication information.

14. The at least one computer readable storage apparatus of claim 11 where the received multicast packet comprises a multicast address corresponding to the multicast group in a header portion of the multicast packet.

15. The at least one computer readable storage apparatus of claim 11, the actions further comprising responding, by the computing device, to a query message sent to the multicast group by a router.

* * * * *